Feb. 27, 1962 F. W. GETZEN 3,022,827
INTRODUCTION OF FLUID INTO AN EARTH FORMATION
Filed July 14, 1958 5 Sheets-Sheet 1

INVENTOR.
FORREST W. GETZEN,
BY
ATTORNEY.

Feb. 27, 1962 F. W. GETZEN 3,022,827
INTRODUCTION OF FLUID INTO AN EARTH FORMATION
Filed July 14, 1958 5 Sheets-Sheet 3

INVENTOR.
FORREST W. GETZEN,
BY
ATTORNEY.

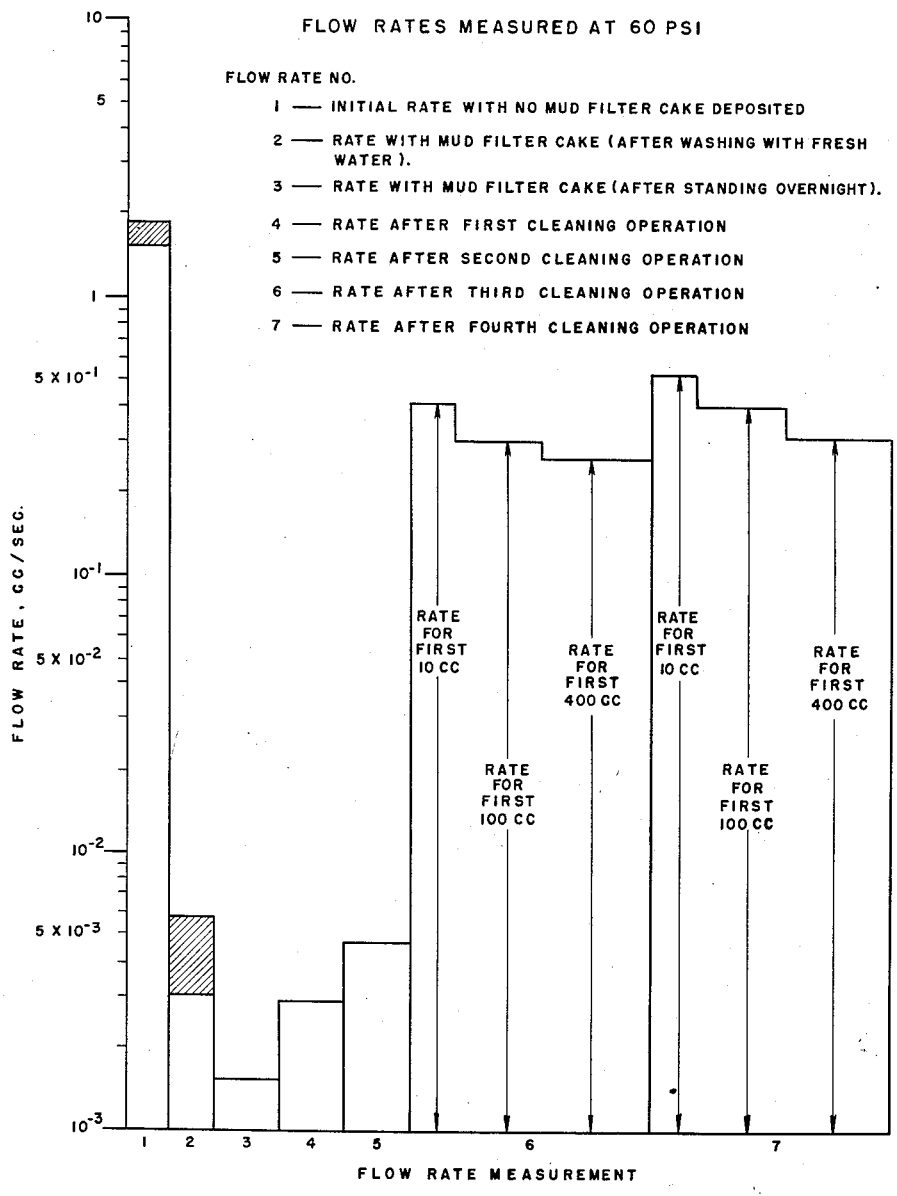
FIG. II.

United States Patent Office 3,022,827
Patented Feb. 27, 1962

3,022,827
INTRODUCTION OF FLUID INTO AN EARTH
FORMATION
Forrest William Getzen, Houston, Tex., assignor, by
mesne assignments, to Jersey Production Research
Company, Tulsa, Okla., a corporation of Delaware
Filed July 14, 1958, Ser. No. 748,280
3 Claims. (Cl. 166—187)

The present invention is directed to method and apparatus for introducing fluid into an earth formation. More particularly, the invention is directed to introducing fluid into an earth formation penetrated by a well in which a filter cake covers an exposed face of the formation. In its more specific aspects, the invention is concerned with method and apparatus for removing the filter cake from an exposed face of the formation and then introducing fluid into the formation from which the filter cake has been removed.

The present invention may be briefly described as involving the introduction of fluid into an earth formation penetrated by a well in which a filter cake covers an exposed face of the formation and in which the well is under control by a hydrostatic column of fluid having a pressure greater than the pressure of the formation in which the filter cake is laterally confined and fluid is then flowed upwardly in the well past the confined filter cake under a pressure greater than the pressure of the formation and the pressure of the hydrostatic column whereby the filter cake is removed from the exposed face and a portion of the fluid is forced into the formation.

The invention may suitably be practiced by expanding a deformable member against the wall of the well under sufficient pressure to contact and confine the filter cake on the exposed face and then flowing fluid upwardly in said well in contact with the filter cake past the expanded deformable member under a pressure greater than the pressure of the formation and the pressure of the hydrostatic column whereby the filter cake is removed and a portion of the fluid is forced into the formation.

An alternate method of practice of the invention is to begin flowing the fluid upwardly in the well first and then expand the deformable member. In this case, fluids pumped into the deformable member through an auxiliary pipe may be employed to expand the deformable member. This arrangement allows the pressure in the deformable member to be controlled throughout the treating operation.

The pressure employed in flowing the fluid past the confined filter cake is greater than formation pressure and greater than the pressure employed to expand the deformable member but insufficient to fracture the formation. In other words, the fluid pressure is desirably held below formation fracturing pressure. While the pressure may vary, it is easily ascertainable since it must be greater than the pressure of the hydrostatic column and the formation pressure.

In the practice of the present invention it is contemplated that the fluid which is flowed past the filter cake may contain a scouring agent. The fluid may suitably be water or may be other liquids, such as oil, or may be a gas or a vapor.

In well drilling, completing, and producing operations, it is frequently necessary or desirable to introduce fluids into the formations which surround the well bore. As an example, for certain well logging operations it is necessary to have treating solutions in the formations which surround the well bore in order to detect and evaluate the producing zones of the formations penetrated. Another situation which often requires that fluids be pumped into formations which surround a well bore is one in which sand, as well as oil, is produced from producing formations. In such cases, various sand consolidating agents must be pumped into the sand producing formations, while at other times it is necessary to pump sealing materials into formations which produce undesirable fluids (water, etc.) into wells being drilled with air or gas as the circulating medium. As another example, in producing operations which involve the secondary recovery of oil, various driving fluids such as water, for example, are pumped into the formations which surround the drive well. Each of these cases requires that fluids be introduced into the formations around a well bore. Frequently, however, there is considerable difficulty in introducing fluids of any kind into surrounding formations of a well. This is particularly true when the well bore is covered with a well-formed filter cake of colloidal particles such as clay. This situation is the usual case—particularly in the drilling operations.

The present invention relates generally to improving the flow of fluids and treating solutions into formations surrounding well bores in which the continuous removal of any existing filter cakes on the wall of the well bore is involved during the flooding or injection operation. In short, in the practice of the present invention, the filter cake material is removed while simultaneously introducing fluids or treating solutions into the surrounding formations. In practicing the invention a tool is employed which incorporates a flexible sleeve or expandable deformable member to confine a section of the well to be treated so that the filter cake may be effectively removed by a scouring action as fluids are pumped around the expanded sleeve.

The present invention will be further illustrated by reference to the drawing in which.

Figure 10:
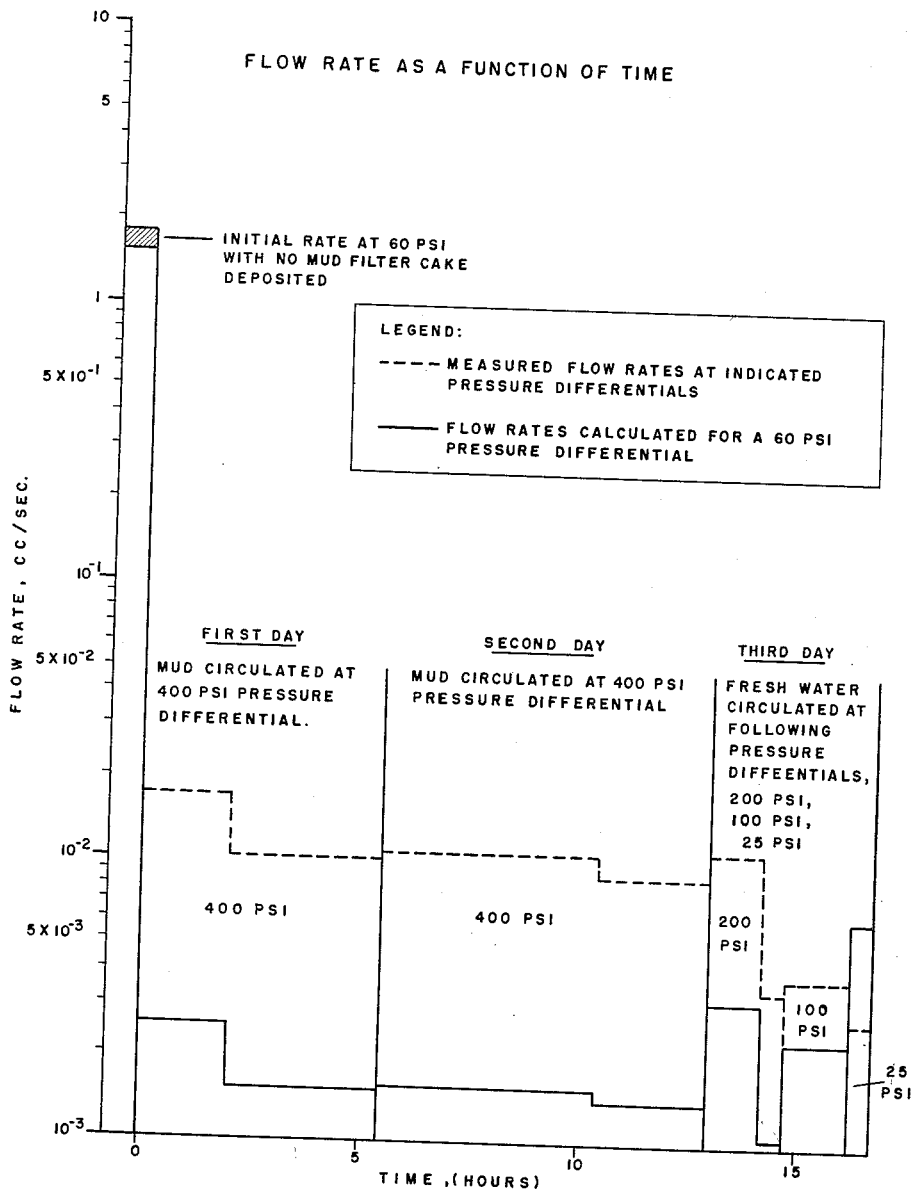

FIGS. 6 to 9, inclusive, are diagrammatic showings of a device employed to demonstrate the present invention;

FIG. 10 is a chart showing the flow rate as a function of time; and

FIG. 11 is a chart illustrating flow rates measured at a constant pressure.

Referring now to the drawing in which identical numerals will be employed to designate identical parts, numeral 11 designates a packer which is used to isolate the tool from the section of hole below the tool during the flooding operation. An inflatable flexible sleeve 12 of sufficient length to span the section into which fluids are to be pumped is located just above the packer 11. Between the packer 11 and the flexible sleeve 12 are ports 13 through which the fluids or treating solutions can be pumped.

The method of cleaning the surface of the bore hole and simultaneously introducing fluids into surrounding formations is described as follows with respect to FIG. 1 and FIG. 2.

Figure 3:
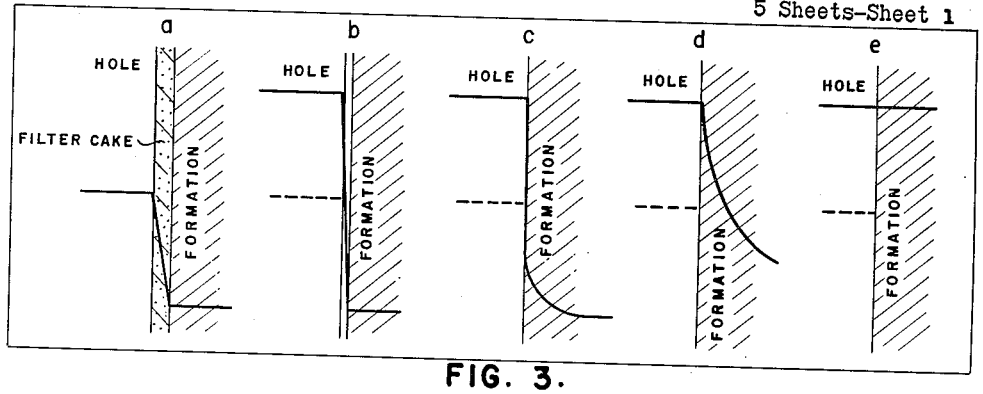
FIG. 3 is an illustration showing the pressure distribution from the well bore into the formation at frequent intervals during a flowing operation.
Figures 1, 2:
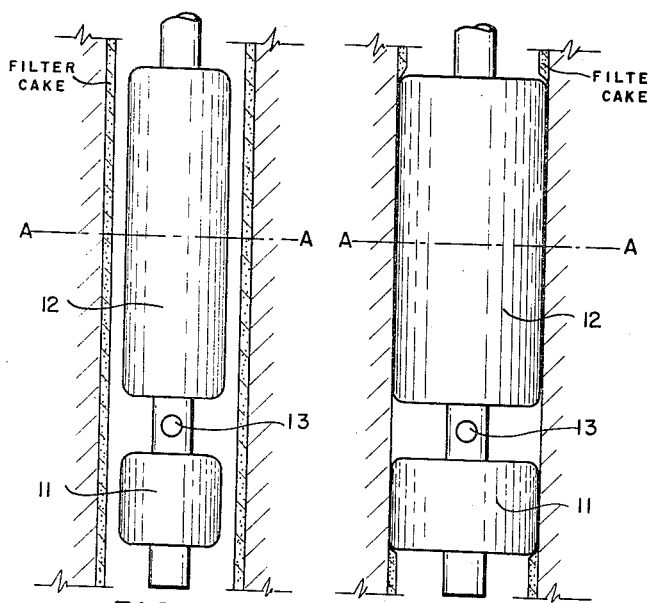
FIG. 1 illustrates the device of the present invention being lowered in and removed from the well.
FIG. 2 illustrates schematically the tool inflated during a treating operation.

The apparatus is lowered into the well down to the desired section while deflated as shown in FIG. 1. The pressure distribution from the bore hole into formation at this step is shown in FIG. 3(a). (The pressure distributions in FIG. 3 are for the section at A in FIGURES 1 and 2.) The packer 11 at the bottom of the tool is seated to prevent loss of fluids into the section of the well below the tool. Then the inflatable flexible sleeve 12 is expanded so that it is against the face of the well bore as shown in FIG. 2. The pressure of the sleeve is adjusted to the maximum pressure desired for flowing fluids into the surrounding formations. Figure 3(b) shows the pressure distribution at A when the sleeve is inflated but when there is no flow of fluids. When the sleeve is inflated during this step, all loose mud and other materials are forced up and away from the formation to be treated.

When the flexible sleeve is in the inflated position as in FIG. 2, the fluids (or treating solutions) to be pumped into the surrounding formations are pumped out through the ports 13 and up between the flexible sleeve and the face of the bore hole. A pumping rate sufficient to give a good scouring action should be maintained for this operation. Also, if necessary, an abrasive material such as clean sand can be included in the first batch of fluids flooded. Such material would do little or no damage to the apparatus. As the pumping is continued, the colloidal materials of the filter cake are scoured from the face of the formation adjacent to the flexible sleeve and washed from the hole. Then, the fluids (or treating solutions) pass unhindered into the surrounding formations.

FIG. 3(c) shows the pressure distribution as the fluids begin to flow into the formation. As the operation is continued, more and more of the fluids are pumped into the formation and less and less escapes at the top of the flexible sleeve. When all of the filter cake has been removed, almost all of the fluid will pass into the surrounding formation. The pressure distribution at A when no filter cake remains is shown in FIG. 3(d). Any slight build-up of filter cake will be washed away immediately as described above.

Using this method of introducing fluids into the formations which surround a well bore, fluids can be pumped into a formation as long as the formation hydrostatic pressure is below the pressure in the flexible sleeve of the tool. The flooding into the formation stops only when the formation hydrostatic pressure is equal to the pressure in the flexible sleeve. Thus, the flooding can always be continued by increasing the (initial) pressure in the flexible sleeve. FIG 3(e) shows the pressure distribution at A after flooding has ceased with the pressure in the formation equal to the pressure in the flexible sleeve.

Figure 4:
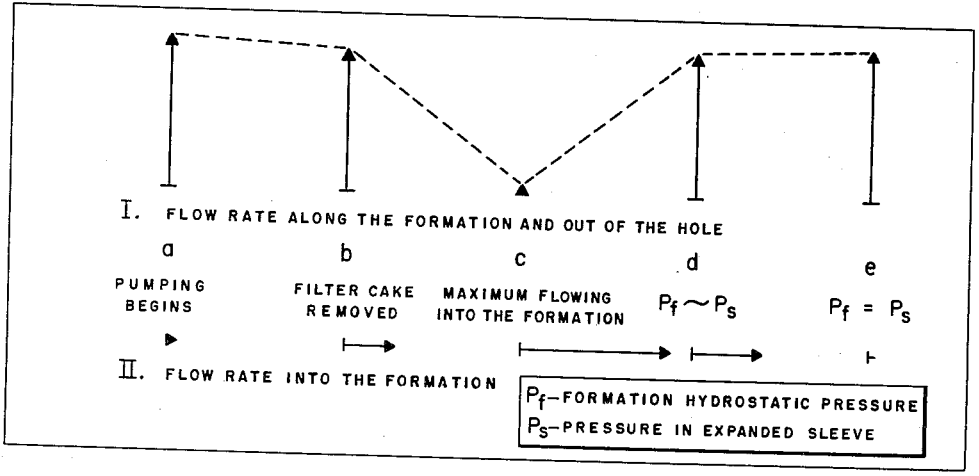
FIG. 4 shows flow rates for a constant pumping rate at intervals during a flowing operation.

FIG. 4 shows the flow rate along and into the formation during the entire flooding operation for a constant pumping rate. Also shown is the rate of production of fluids from the hole during this flooding operation. It should be pointed out that in some operations (e.g. water flooding for secondary recovery) the flow rate of fluids into the formation would not drop off during the flooding, but would remain essentially constant at its maximum value.

Figure 5:
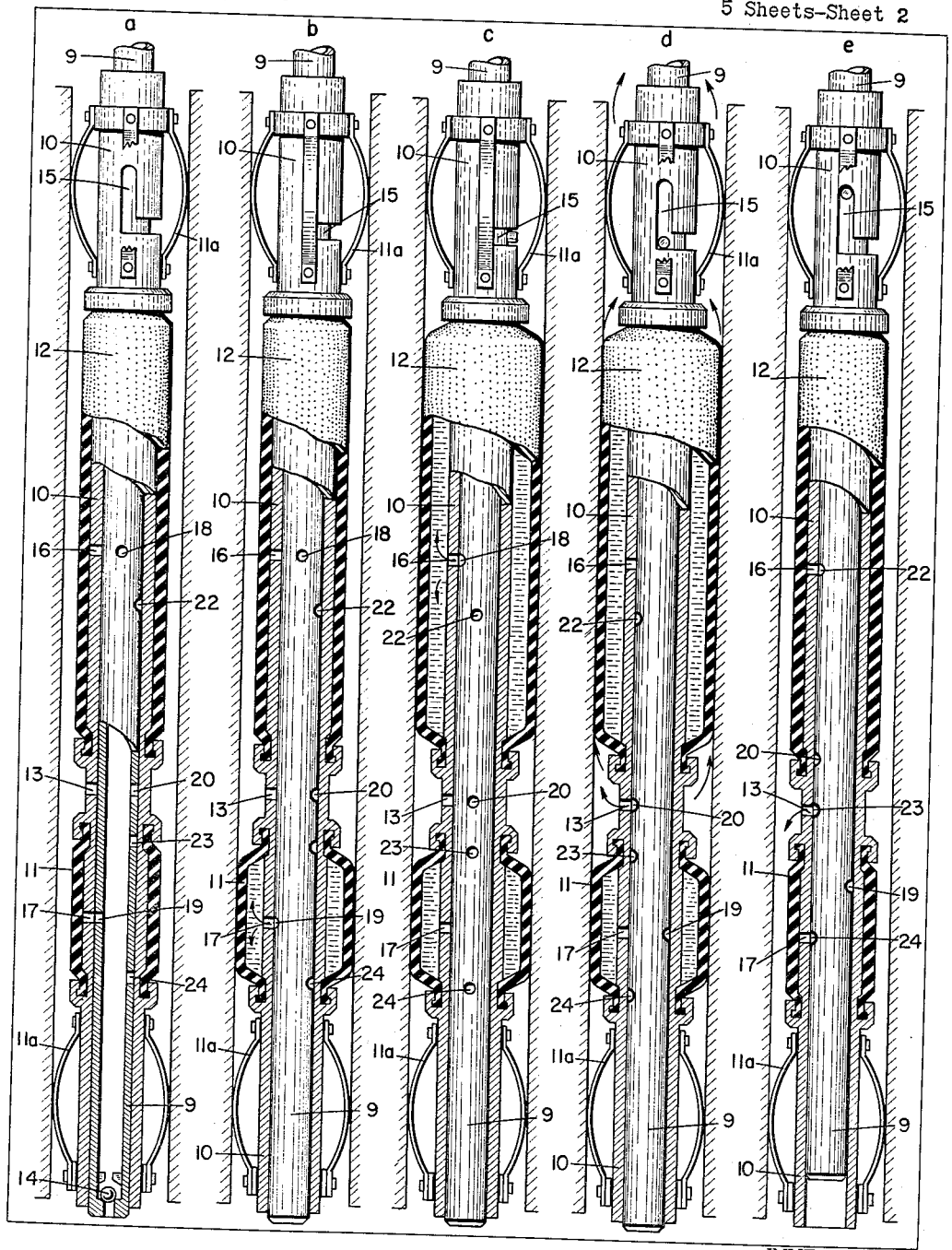
FIG. 5 is an illustration of the device of the present invention.

FIG. 5 shows a tool which could be used for this flowing operation. The essential operations of the tool are shown in FIG. 5(a), (b), (c), (d), and (e) of the figure. The tool is lowered into the well as in FIG. 5(a) and comprises a tubing 9 having a mandrel 10 arranged on its lower end, the tubing 9 being movable relative to the mandrel 10. The reverse caged check valve 14 in tubing 9 is open while the tool is being lowered into the well. This valve closes automatically when the tool is positioned properly in the well next to the desired formation.

Mandrel 10 is provided with drag springs 11a which hold the mandrel from rotation with respect to the tubing within the limits of a J slot arrangement 15.

The mandrel 10 has arranged thereon a flexible packer 11 and a flexible sleeve 12. The mandrel has ports 16 and 17 which communicate with the interior of packer 11 and sleeve 12, respectively. The tubing 9 is also provided with ports 18 and 19 which upon proper manipulation of tubing 9 are brought into contact with ports 16 and 17.

Mandrel 10 is provided with a port 13 positioned between the packer 11 and the sleeve 12. The tubing 9 has a port 20 which upon rotation of the tubing comes in contact with the port 13.

The tubing 9 is also provided with ports 22, 23, and 24, the purpose of which will herein later be described.

The tool is lowered into the borehole in the position as shown in FIG. 5a with port 19 communicating with port 17. Water is pumped down the tubing through the ports 19 and 17 and the packer 11 is inflated sufficiently to seal off the well bore as shown in FIG. 5b. The tubing is rotated 90 degrees, closing off port 17 and bringing into contact ports 18 and 16. The flexible sleeve 12 is then inflated to the desired pressure as shown in FIG. 5c.

The tubing is again rotated 90 degrees to the right, closing off port 16 and opening port 13 to port 20, as shown in FIG. 5d.

The tool is now in a position for the operations of cleaning the face of the formation and pumping the fluids into the formation. At the end of these operations the tool is deflated by raising the tubing 9 within the limits of the J slot 15, which action brings the ports 22, 23 and 24 in contact with the ports 16, 13 and 17, respectively, as can be seen in FIG. 5e. The tool can now be removed from the borehole.

The use of such a tool for flowing fluids and treating solutions into the formations which surround a well bore has the following advantages:

(1) The filter cake on the face of the formation can be removed effectively and the formation of additional filter cakes during the flowing operation is entirely eliminated.

(2) An accurate knowledge of the amount of fluids flowed into a formation is known for the entire flowing operation.

(3) If fracture pressures are known, the danger of fracturing the formation during a flowing operation is completely eliminated; since the pressure of the fluids flowed into the formation can never exceed the pressure in the flexible sleeve, and this pressure can always be controlled.

(4) The tool used in this operation is simple to operate and requires little time for operation.

(5) The length of section to be treated need not be limited, since repeated operations can be used for sections of a formation which are longer than the flexible sleeve.

While not specifically described above, other operations can be improved with the use of this tool. For example, it can be used to remove the mud filter cake from the face of a well bore hole—either in a producing zone or throughout the entire length of a hole—before a primary cementing operation. Also, in the case of production from a particularly sandy section of hole, the flexible sleeve section of the tool may be installed permanently at the producing zone to serve as a check valve and prevent the accumulation of sand in the well bore at the producing zone.

In order to illustrate the invention further, several operations were carried out to demonstrate the advantages of the present invention and the operation including expanding a flexible sleeve in a well bore. In the particular runs, the treating operation was performed by inflating a flexible sleeve in the equivalent of a portion of the well bore to be treated and then pumping treating fluids around the formation and into the surrounding formation. During the treating operation the mud filter cake on the face of the bore hole is removed so that fluids may pass into the formation.

In the particular operations to demonstrate the present invention, a cylindrical Berea Sandstone core to simulate a permeable formation surrounding a well bore was used. The cylindrical core was 12 inches in length and 3½ inches in diameter and had a 1-inch concentric hole to simulate a well bore. The core was mounted in a steel jacket which was provided with four small openings through which fluids could be flooded either into or from the rock core. The jacket and core combination could be mounted in a mud circulating system for the deposition of a mud filter cake or in a special flooding system for the introduction of the treating fluids.

Tests were made to determine (1) the ease and speed with which the mud filter cake could be removed and (2) the ease and speed with which the treating fluids could be pumped into the permeable rock sample. The operations performed in this experiment are illustrated in FIGURES 6, 7, 8 and 9 in which $a$ is the cylindrical rock sample, $b$ are the small openings through which fluids are pumped, $c$ is the mud filter cake, $d$ is the flexible sleeve (a rubber tube), $e$ is a steel line into the flexible sleeve, and $f$ is the lead into the concentric hole and around the flexible sleeve.

The sequence of operations for this experiment was carried out as follows, referring to FIGURES 6, 7, 8 and 9:

(1) Fresh water was backflooded through the ports $b$ and into the rock sample to wash the core and remove any filter cake on the face of the concentric hole. Fresh water was then flowed through the rock sample from the concentric hole and into the ports $b$ to check the permeability of the core sample without the mud filter cake. For easy reference, only the flow rates through the core with a pressure differential across the rock sample (into the rock from the concentric hole) of 60 p.s.i. were recorded for comparison. Where flooding was done at pressures other than 60 p.s.i., flow rates at 60 p.s.i. were calculated as follows:

Calculated flow rate (60 p.s.i.) =
(measured flow rate) × (60/pressure dif.)

Figure 6:
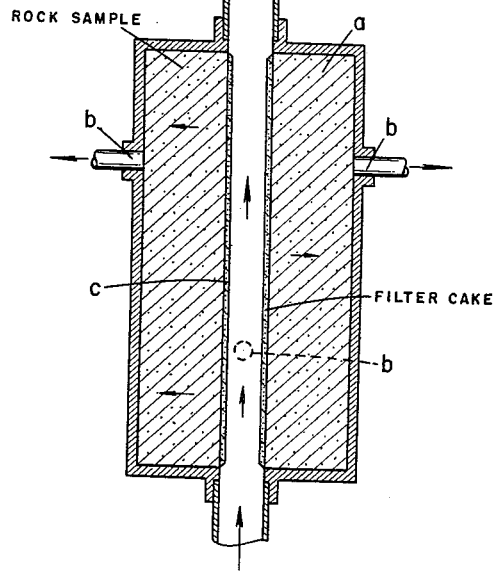

(2) The jacketed rock sample was mounted in the mud circulating system for the deposition of a mud filter cake along the face of the concentric hole as shown in FIG. 6. The mud was circulated for a total of 13 hours at a pressure differential into the rock of 400 p.s.i. The rate of circulation along the face of the concentric hole during this operation was 113 ft./min. The liquids produced from the ports $b$ were collected at intervals and the volume of these liquids was used to calculate a (gross) flow rate of fluids through the rock sample at 400 p.s.i. and—using the above formula—at 60 p.s.i.

(3) The mud in the mud circulating system was replaced with fresh water and then the fresh water was circulated through the concentric hole in the rock sample in an effort to remove as much of the mud filter cake as possible in such a washing operation. The fresh water was circulated through the rock sample for a total of 6¼ hours at pressure differentials of 200, 100, and finally 25 p.s.i. The corresponding flow rates along the face of the hole during this operation were 194, 250, and 246 ft./min. The flow rate of the fresh water through the rock sample and out of the ports $b$ were measured at intervals for each pressure differential. These flow rate values were used to calculate flow rates at 60 p.s.i. as above.

Figure 7:
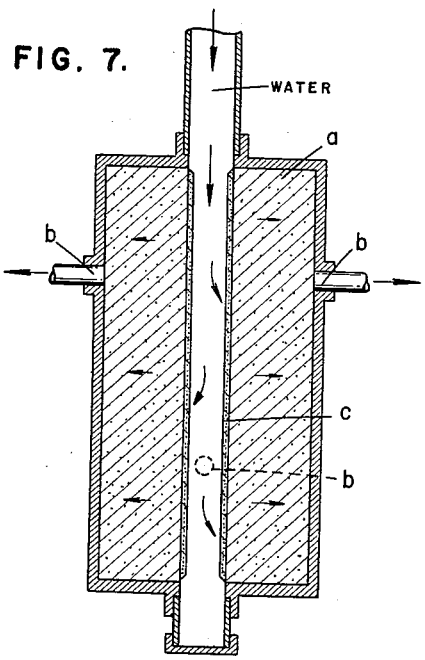

(4) The jacketed rock sample was then mounted in the special flooding system for the cleaning and flooding operation. A check on the permeability of the rock sample with the mud filter cake was obtained by flooding fresh water through the system as shown in FIG. 7. The initial (measured) flow rate at 60 p.s.i. pressure differential was in excellent agreement with the final (calculated) value obtained from the circulation of fresh water in step No. 3 above. However, the rate gradually decreased as the flooding continued. The final measured flow rate—after flooding through the filter cake and rock sample overnight—was $1.5 \times 10^{-3}$ cc./sec. as compared to the initial rate of $5.8 \times 10^{-3}$ cc./sec.

Figure 8:
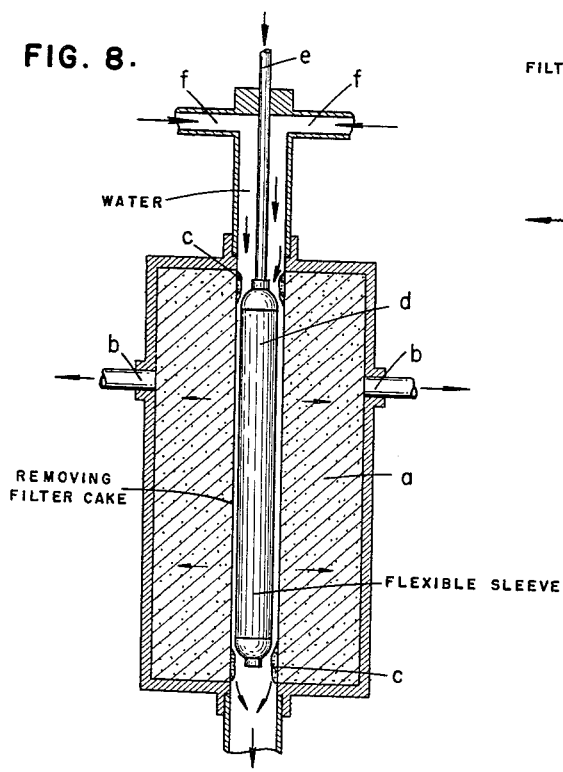

(5) Next, a flexible rubber tube was positioned in the concentric hole as shown in FIG. 8. The tube was inflated with water through $e$ so that it pressed against the mud filter cake with a nominal pressure of about 60 p.s.i. Water was then circulated in through $f$ and between the rubber tube and the face of the hole, as shown in FIG. 8. The flooding was begun at a pressure of 60 p.s.i. This operation produced an immediate removal of mud filter cake along the face of the concentric hole and an increase in the permeability of the rock sample around the hole as evidenced by: ($a$) immediate production of a thick mud suspension at the exit end of the hole and ($b$) immediate increase in the rate of flow of fluids out of the ports $b$. A careful adjustment of pressure of the water flowing into $f$ produced flow through both the ports $b$ and the exit of the hole. The flow through the exit of the hole could be stopped by increasing the pressure inside the rubber tube $d$, i.e., by pumping more water into $e$ under pressure. The entire washing operation required only a few minutes. However, an effort to improve the washing action by increasing the pressure of the water entering at $f$ resulted in a damaged rubber tube when the pressure reached 100 p.s.i. in $f$.

The rubber tube was replaced and the cleaning operation was repeated. Some additional removal of mud filter cake and increase in permeability were obtained; however, the rubber tube was damaged again at 100 p.s.i.

The second rubber tube was replaced with a tube of better grade rubber and the cleaning and flooding cycle was repeated. This time, the flexible tube functioned properly with pressures in $f$ up to 400 p.s.i. A pump was used to drive the water through $f$ and into the concentric hole. An increase in pressure produced a slight increase in the rate of flow of water from the exit of the hole and, at the same time, it produced a marked increase in the flow of water through the rock and out of the ports $b$. Continued flooding produced no drop in the flow rate of the water through the rock and out of the ports $b$; however, when the rubber tube was deflated so that the flow rate through the rock at 60 p.s.i. could be measured, there was a gradual drop in permeability, i.e., the flow rate through the rock at 60 p.s.i. gradually dropped off.

Figure 9:
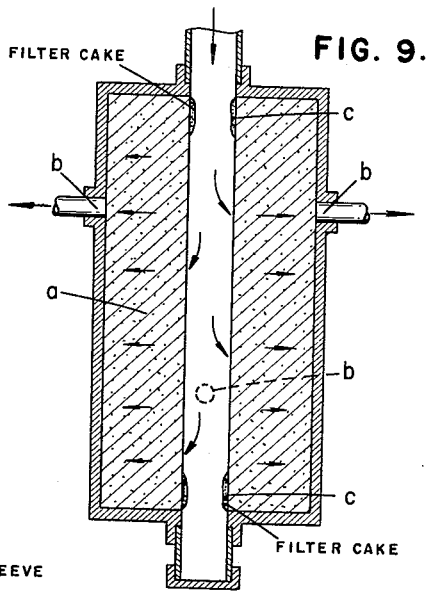

The cleaning and flooding operation was repeated a fourth time. In this case, there was little improvement in permeability—as evidenced by the flow rate through the rock at 60 p.s.i.—over that obtained in the third cleaning operation. Apparently, most of the filter cake which could be removed in this experimental apparatus was removed in the first three cleaning operations. Because of the limited dimensions of the flexible rubber tube, some of the clay filter cake remained at each end of the concentric hole as shown in FIG. 9.

A record of the measured flow rates through the rock sample during the deposition of the mud filter cake and during the fresh water washing operation is shown in FIG. 10. Also shown in this figure is the flow rate through the rock sample calculated for a 60 p.s.i pressure differential into the rock sample. FIG. 11 is a record of the measured flow rates through the rock sample at 60 p.s.i. before the mud filter cake was deposited, after the mud filter cake was deposited, and after each cleaning operation using the flexible rubber tube in the concentric hole.

This series of operations has demonstrated that a mud filter cake can be removed from a bore hole and fluids can be pumped into the formation which surrounds the bore hole as described. The results have shown that the entire operation can be carried out quickly and efficiently. No difficulty, other than the damage to the flexible rubber tubes, was encountered in this demonstration.

It will be clear from the foregoing operations that the present invention is quite advantageous as has been set out before.

It is to be emphasized in the practice of the present invention that the important feature of the invention is to decrease the annular space between the sleeve and the filter cake to substantially zero such that an extremely small clearance is maintained which allows washing away of the filter cake. The maintenance of this extremely small clearance between the flexible sleeve and the filter cake confines the filter cake laterally and makes the washing operation possible. For example, circulating water past a filter cake for an extended period of time at rates of 200 to 250 feet per minute had little effect on filter cake permeability. At such flow rates, water was circulated at rates of 7.9 to 10.2 gallons per minute with about 1800 gallons of water being circulated. The small increase of the flow rate through the filter cake during this operation is accounted for by compressibility of the filter cake when the pressure differential into the rock was decreased from 200 to 25 p.s.i.

In contrast with a circulation rate of 7.9 to 10.2 gallons per minute while attempting to wash away filter cake, an operation was conducted in accordance with the present invention with flow past an expanded deformable member or flexible sleeve in which the flow rate was 1 to 2 gallons per minute and cleaning was obtained as shown by the data with only 1.6 gallons of water. Even though the pumping rate was substantially lower than where washing was not obtained, the velocity of the fluid in accordance with the present invention past the filter cake was substantially and enormously higher. In the practicing of the present invention, it is important that enough pressure be applied inside the flexible sleeve to expand it to contact the wall of the bore hole to confine the filter cake laterally and the pressure in the circulating fluid must be enough greater than the pressure in the flexible sleeve to force fluid past the flexible sleeve and confined filter cake. This pressure must be held below formation fracturing pressure. Once circulation past the flexible sleeve is started, then the circulation rate and velocity of the fluid is related to the pressure differential between the flexible sleeve and circulation pressure and would not be related to the level of pressure at which the operation is conducted. For example, at 50 p.s.i. pressure differential, the flow rate would be substantially the same if the operation were conducted at a formation pressure of 100 p.s.i. or at 500 p.s.i. In the several examples, the sleeve pressure was about 60 p.s.i. with a differential pressure being about 5 p.s.i.

It will be seen from the foregoing description and the several examples that the present invention is quite advantageous and useful and may be employed for treating formations, introducing fluids into formations, and other operations where fluid flow into formations is involved.

The nature and objects of the present invention having been fully described and illustrated, what I wish to claim as new and useful and secure by Letters Patent is:

1. Apparatus for introducing fluid into an earth formation penetrated by a well having a filter cake covering an exposed face of said formation which comprises, in combination, a tubing string, a tubular mandrel arranged embraceably and carried on the lower end of said tubing string, said tubing string being rotationally and vertically movable relative to said mandrel, a check valve in the lower end of said tubing string providing flow upwardly but resisting flow downwardly through said tubing string, first and second vertically spaced apart expandable deformable members carried externally by said mandrel, said mandrel and said tubing string each being provided with first, second, and third ports adapted to be placed in correspondence on limited rotational and vertical movement of said tubing string relative to said mandrel, means for limiting rotational and vertical movement of said tubing string relative to said mandrel, the first ports being arranged in said mandrel and tubing string to provide fluid communication between said tubing string and the interior of the first deformable member on rotation of said tubing string 90° relative to said mandrel, the second ports being arranged in said mandrel and tubing string to provide fluid communication between said tubing string and the interior of the second deformable member on further rotation of said tubing string 90° relative to said mandrel, and the third ports being arranged in said mandrel and tubing string to provide fluid communication between the space and the interior of the tubing string on vertical movement of said tubing string relative to said mandrel, and means for holding said mandrel in said well for movement of said tubing relative to said mandrel.

2. Apparatus for introducing fluid into an earth formation penetrated by a well having a filter cake covering an exposed face of said formation which comprises, in combination, a tubular member, a tubular mandrel arranged embraceably and carried on the lower end of said tubular member, said tubular member being rotationally and vertically movable relative to said mandrel, means in the lower end of said tubular member providing flow upwardly but resisting flow downwardly through said tubular member, first and second vertically spaced apart expandable deformable members carried externally by said mandrel, said mandrel and said tubular member each being provided with first, second, and third ports adapted to be placed in correspondence on limited rotational and vertical movement of said tubular member relative to said mandrel, means for limiting rotational and vertical movement of said tubular member relative to said mandrel, the first ports being arranged in said mandrel and tubular member to provide fluid communication between said tubular member and the interior of the first deformable member on rotation of said tubular member relative to said mandrel, the second ports being arranged in said mandrel and tubular member to provide fluid communication between said tubular member and the interior of the second deformable member on further rotation of said tubular member relative to said mandrel, and the third ports being arranged in said mandrel and tubular member to provide fluid communication between the space and the interior of the tubular member on vertical movement of said tubular member relative to said mandrel, and means for holding said mandrel in said well for movement of said tubular member relative to said mandrel.

3. Apparatus for introducing fluid into an earth formation penetrated by a well having a filter cake covering an exposed face of said formation which comprises, in combination, a tubing string, a tubular mandrel arranged embraceably and carried on the lower end of said tubing string, said tubing string being rotationally and vertically movable relative to said mandrel, means in the lower end of said tubing string providing flow upwardly but resisting flow downwardly through said tubing string, first and second vertically spaced apart expandable deformable members carried externally by said mandrel, said mandrel and said tubing string each being provided with first, second, and third ports adapted to be placed in correspondence on limited rotational and vertical movement of said tubing string relative to said mandrel, means for limiting rotational and vertical movement of said tubing string relative to said mandrel, the first ports being arranged in said mandrel and tubing string to provide fluid communication between said tubing string and the interior of the first deformable member on rotation of said tubing string relative to said mandrel, the second ports being arranged in said mandrel and tubing string to provide fluid communication between said tubing string and the interior of the second deformable member on further rotation of said tubing string relative to said mandrel, and the third ports being arranged in said mandrel and tubing string to provide fluid communication between the space and the interior of the tubing string on vertical movement of said tubing string relative to said mandrel, and means for holding said mandrel in said well for movement of said tubing relative to said mandrel.

References Cited in the file of this patent

UNITED STATES PATENTS

| | | |
|---|---|---|
| 1,778,740 | Wightman | Oct. 21, 1930 |
| 1,790,678 | Reinhold | Feb. 3, 1931 |

(Other references on following page)

UNITED STATES PATENTS

| | | |
|---|---|---|
| 2,193,144 | Rymal | Mar. 12, 1940 |
| 2,338,372 | Wright | Jan. 4, 1944 |
| 2,503,719 | Garrison | Apr. 11, 1950 |
| 2,517,017 | Nestle | Aug. 1, 1950 |
| 2,603,293 | Lynes | July 15, 1952 |
| 2,619,180 | Smith et al. | Nov. 25, 1952 |
| 2,749,988 | West | June 12, 1956 |
| 2,798,560 | Allen et al. | July 9, 1957 |
| 2,831,541 | Conover | Apr. 22, 1958 |
| 2,851,111 | Jones | Sept. 9, 1958 |
| 2,910,123 | Elkins et al. | Oct. 27, 1959 |